(12) United States Patent
Morita

(10) Patent No.: US 6,577,791 B1
(45) Date of Patent: Jun. 10, 2003

(54) OPTICAL WAVEGUIDE ELEMENT, A THREE-DIMENSIONAL OPTICAL WAVEGUIDE CIRCUIT AND OPTICAL SYSTEM

(75) Inventor: Shinzo Morita, Nagoya (JP)

(73) Assignee: Nagoya University, Nagoya (JP)

( * ) Notice: Subject to any disclaimer, the term of this patent is extended or adjusted under 35 U.S.C. 154(b) by 0 days.

(21) Appl. No.: 09/648,548

(22) Filed: Aug. 28, 2000

(30) Foreign Application Priority Data

Sep. 3, 1999 (JP) ............................... 11-249502
Jun. 2, 2000 (JP) ....................... 2000-165421

(51) Int. Cl.$^7$ ................................. G02B 6/32
(52) U.S. Cl. ......................................... 385/35; 385/146
(58) Field of Search ............................ 385/146, 27, 28, 385/31, 33, 35

(56) References Cited

U.S. PATENT DOCUMENTS

| 3,552,822 | A | * | 1/1971 | Altman ....................... 353/67 |
| 4,269,648 | A |   | 5/1981 | Dakss et al. |
| 4,371,233 | A | * | 2/1983 | Masuda ....................... 385/74 |
| 4,380,365 | A |   | 4/1983 | Gross |
| 4,781,431 | A |   | 11/1988 | Wesson et al. |
| 5,016,965 | A | * | 5/1991 | Marshall et al. ............... 385/35 |
| 5,323,268 | A |   | 6/1994 | Kikuchi |
| 5,437,092 | A |   | 8/1995 | Hartman et al. |
| 6,261,402 | B1 | * | 7/2001 | Watanabe et al. ........... 156/230 |

FOREIGN PATENT DOCUMENTS

| CA | 1137797 | 12/1982 |
| JP | 42-4396 | 2/1942 |
| JP | A-59-26702 | 2/1984 |
| JP | A-62-81607 | 4/1987 |
| JP | A-3-175402 | 7/1991 |
| JP | A-10-253202 | 9/1998 |

OTHER PUBLICATIONS

S. Masuda et al., "Low–loss lens connector for single–mode fibers", Applied Optics, vol. 21, No. 19, Oct. 1, 1982, pp. 3475–3483.

* cited by examiner

*Primary Examiner*—Euncha Cherry
(74) *Attorney, Agent, or Firm*—Oliff & Berridge, PLC

(57) ABSTRACT

An optical waveguide element has plural spherical bodies arranged in straight or curve with diameters of not more than 100 μm made of transparent uniform glass. The optical waveguide element may have plural spherical bodies arranged in straight or curve as are viewed from their ends with diameters of not more than 100 μm made of transparent uniform glass.

8 Claims, 9 Drawing Sheets

OPTICAL WAVEGUIDE ELEMENT, A THREE-DIMENSIONAL OPTICAL WAVEGUIDE CIRCUIT AND OPTICAL SYSTEM

BACKGROUND OF THE INVENTION

1) Field of the Invention

This invention relates to an optical waveguide element, a three-dimensional optical waveguide circuit and an optical system.

2) Description of the Prior Art

In such an optical waveguide element and a laser gyroscope using a thin film optical waveguide, a multi-level crossing optical waveguide is not realized on the same surface of a substrate. The reason is because light goes straight.

Recently, with the development of multiplexing technique in optical communication and the increase of the necessity for monolithic optical integrated elements, various multi-level crossing technique in optical communication paths have been developed.

However, it has not been succeeded to make the multi-level crossing optical waveguide on the same surface of the substrate by a conventional circuit manufacturing technique.

SUMMERY OF THE INVENTION

In view of the above actual situation, it is an object of the present invention to provide an optical waveguide element in which minute optical communication paths can be formed, a three-dimensional optical waveguide circuit and an optical system using the optical waveguide element.

For achieving the object, an optical waveguide element of the present invention comprises arranged plural spherical bodies with diameters of not more than 100 μm made of transparent uniform glass.

Moreover, an optical waveguide element of the present invention also comprises arranged plural columnar bodies with diameters of not more than 100 μm made of transparent uniform glass which are arranged in an orthogonal direction to their central axes.

According to the present invention, since the optical waveguide element is composed of minute transparent glass spherical bodies or minute transparent glass columnar bodies, it can have a minute optical communication path with a given shape. Moreover, in a preferred embodiment of the optical waveguide element, the glass spherical bodies or the glass columnar bodies may be arranged in straight or in curve. Therefore, the optical communication path can be formed in straight or in curve with a given curvature.

Moreover, in another preferred embodiment of the optical waveguide element, the transparent glass spherical bodies or the transparent glass columnar bodies arranged in straight or in curve, which are one unit, may be stacked. Thereby, a multi-optical communication path, in which plural of the planer optical communication path as one unit composed of the glass bodies arranged in straight or in curve are stacked, can be formed.

Furthermore, a multi-level crossing three-dimensional optical waveguide can be fabricated by combining the above optical waveguide element of the present invention and a thin film optical waveguide element.

Then, an optical system having a minute optical communication path with a given shape can be fabricated by combining the above optical waveguide element and an external optical system.

Japanese Laid-open Publication Kokai Sho 59-26702 (JP A 59-26702) discloses that image is transmitted through a flexible cylinder with spherical lenses made of optical glass therein. However, this invention relates to the optical communication, not the image transmission.

That is, in the image transmission, the astigmatisms in glass spherical bodies must be considered. For transmitting an image without its reversion and deformation, each glass spherical body is required to have a diameter of not less than 1 mm. Moreover, since the image does not converge into the glass spherical bodies arranged in curve in the transmission direction, it can not be transmitted.

On the contrary, in the optical communication according to the present invention, as mentioned later, the glass spherical bodies or the glass columnar bodies are required to have diameters of not more than 100 μm because of its communication mechanism. Then, because of the communication mechanism, the linear optical communication or the curved optical communication is realized.

In other word, the technique disclosed in JP A 59-26702 is similar to this invention in geometrical optics, but the above technique is quite different from this invention in the transmission principle.

Moreover, Japanese Laid-open Publication Kokai Hei 3-175402 (JPA 3-175402) discloses that a transparent material with higher refractive index than that of the material constituting a substrate is fill up in minute openings formed on a flat surface of a substrate to form transmission paths, and images are transmitted through the transmission paths. In this case, referring to the above argument, the disclosed technique is quite different from this invention. Even in the embodiments in the publication, each image is transmitted through only one minute opening embedded by the transparent material via a semi-spherical lens.

Japanese Laid-open Publication Kokai Sho 62-81607 (JP A 62-81607) also discloses a similar technique to this invention. This publication discloses that an optical communication path is composed of a clad portion and a core portion made of a material with higher refractive index than that of the clad portion, and thereby, light is transmitted through the core portion. Therefore, the disclosed technique is different from this invention in which light is transmitted through plural uniform glass spherical bodies or plural uniform glass columnar bodies in their diameter direction.

Moreover, Japanese Laid-open Publication Kokai Hei 10-235202 (JP A 235202) discloses that light is transmitted in single columnar body in its longitudinal direction, and thus, is different from this invention.

BRIEF DESCRIPTION OF THE DRAWINGS

For better understanding of the present invention, reference is made to the attached drawings, wherein.

DESCRIPTION OF THE PREFERRED EMBODIMENTS

Optical Transmission Theory in the Optical Waveguide Element with Arranged Minute Glass Spherical Bodies or Minute Glass Columnar Bodies This invention will be described in detail as follows:

First of all, the optical transmission theory in the optical waveguide element with plural glass spherical bodies or glass columnar bodies arranged in a given shape will be explained on a preferred embodiment of the present invention. Herein, scattering and absorption of light does not occur at the surfaces and the inner sides of the glass spherical bodies or the glass columnar bodies.

(a) Linear arrangement of the glass spherical bodies

Figure 1:
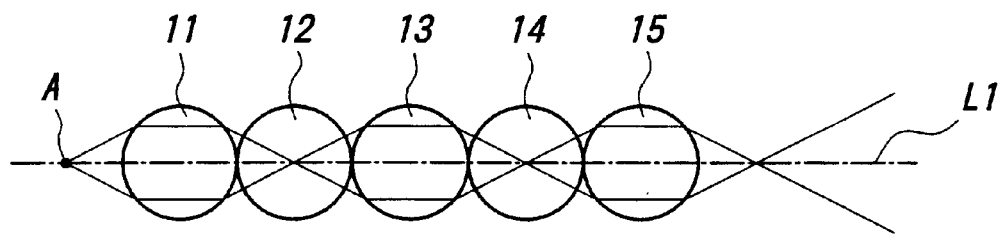
FIG. 1 is a schematic view for explaining the optical transmission in the optical waveguide element of the present invention with linearly arranged minute spherical bodies made of transparent glass.

FIG. 1 is a schematic view for explaining the optical transmission in the optical waveguide element of the present invention with linearly arranged minute spherical bodies made of transparent glass.

In FIG. 1, reference numerals 11–15 designate minute glass spherical bodies, and reference character L1 designates an arrangement axis and reference character A designates a light source (spot light source) positioned on the arrangement axis L1. The light source A is separated from the minute glass spherical body 11 by a distance equal to the radius of the glass body 11.

If the glass spherical bodies 11–15 have the almost same diameter and almost same high spherically, the light from the light source A focus on the center of the minute glass spherical body 12 by the lens effect of the minute glass spherical body 11. In this case, the light passed through the glass spherical body 11 is transmitted straight into the glass spherical body 12 without the refraction thereof at the spherical surface of the glass body 12. Therefore, the light passed through the glass spherical body 12 focus on the center of the minute glass spherical body 14 by the lens effect of the minute glass spherical body 13.

In the case that the light from the light source focus on the centers of the even number's minute glass spherical bodies (12, 14) by the lens effect of the odd number's minute glass spherical bodies (11, 13, 15), the light transmission without attenuation requires that the light from the light source A is refracted at the spherical surface of the minute glass spherical body 11 and is transmitted in the body 11 in a parallel direction to the arrangement axis L1.

The required condition means that the light is transmitted with following A-P-D order. Therefore, on condition that the solid angle of the light from the light source A is $\phi$ and the incident angle of the light to the minute glass spherical body 11 is $\theta i$ and the refractive angle of the light at the spherical surface of the minute glass spherical body 11 is $\theta 0$, and the refractive index of the minute glass spherical body 11 is n, the following equation must be satisfied.

$$\sin \theta i/\sin \theta 0 = \sin(\theta 0 + \phi)/\sin \theta 0 \qquad (1)$$

When a tangent angle is drawn out to the minute glass spherical body 11 from the light source A, and reference character "Q" is given to the tangent point, $\triangle AQC$ constitutes a right-angled triangle. Therefore, since $\angle CAQ$ is 30 degrees and $\angle QCA$ is 60 degrees under the condition of AC:CQ=2:1, it is required that the solid angle $\theta$ is less than 30 degrees and the refractive angle $\theta 0$ is less than 60 degrees. In this case, since the above equation can be transformed into the equation of $n\sin \theta 0 = \sin \theta i$, and then, the relation of $\sin \theta i \leq 1$ is satisfied, the relation of $\sin \theta 0 \leq 1/n$ can be obtained. As a result, if the value of the refractive angle $\theta 0$ is determined, the solid angle $\phi$ can be obtained.

Only the light with a solid angle of not more than the solid angle $\phi$ introduced into the minute glass spherical body 11 from the light source A can be transmitted in the arranged glass spherical bodies. If the distance between the light source A and the minute glass spherical body 11 is larger than the radius "a" of the body 11, the light focus on the nearby part of the glass spherical body 12 to the minute glass spherical body 11 from the center thereof by the lens effect of the body 11. As a result, the light passed through the minute glass spherical body 12 is spread, and thus, the amount of the light to be passed through the minute glass spherical body 13 is decreased. In this way, at every time when the light is passed through each glass spherical body, the amount of the light is decreased.

If the distance between the light source A and minute glass spherical body 11 is smaller than the radius a of the body 11, the light from the light source A focus on the remote part of the minute glass spherical body 12 to the minute glass spherical body 11 from the center thereof. In this case, the amount of the light to be passed through the minute glass spherical body 12 from the minute glass spherical body 11 is decreased. As a result, at every time when the light is passed through each glass spherical body, the amount of the light is decreased.

The fluctuation of the light due to the shift of the glass spherical body from the arrangement axis L1 or the position shift of the light source A may attenuate the transmission amount of the light. Therefore, it is desired that the solid angle θ has a relatively small value, and so the refractive index has a relatively large value. Moreover, it is required that the diameter of each glass spherical body is 100 μm or below.

The lower limited value of the diameter of the glass spherical body is not restricted, but is preferably 1 μm or over in view of good optical transmission.

Similarly, each glass spherical body has preferably a spherically of not more than 2%. The wording "spherically" means the divided value of the difference in between the maximum diameter and the minimum diameter of a spherical body by the average diameter thereof.

Figure 3:
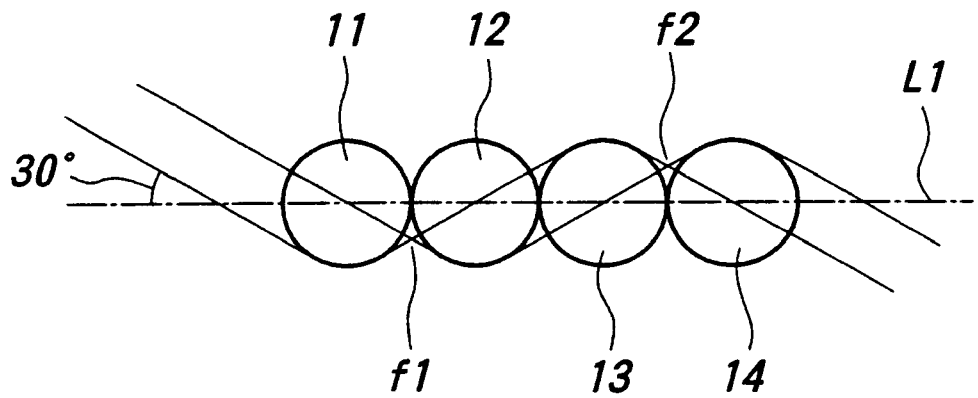
FIG. 3 is a schematic view for explaining the optical transmission in which a parallel light is introduced into the forefront glass spherical body at the incident angle of 30 degrees for the arrangement direction of the glass spherical bodies in the optical waveguide element in FIG. 1.

FIG. 3 is a schematic view for explaining the optical transmission in which a parallel light is introduced into the forefront glass spherical body at the angle of 30 degrees for the arrangement direction of the glass spherical bodies in the optical waveguide element in FIG. 1.

In this case, the parallel light is introduced into the minute glass spherical body 11, and focus on the point "f1" in between the minute glass spherical bodies 11 and 12. Thereafter, the focused light is passed through the minute glass spherical body 12 to be converted to a parallel light again. The parallel light is also introduced into the minute glass spherical body 13 at the angle of 30 degrees to the arrangement axis L1, and then, is focused on the point "f2" in between the minute glass spherical bodies 13 and 14. The focused light is also passed through the minute glass spherical body 14 to be a parallel light again.

Thereafter, the parallel light is introduced into the odd number's minute glass spherical body, and is focus on the point in between the odd number's and the subsequent even number's minute glass spherical bodies. Then, the focus light is passed through the even number's glass spherical body to be converted to a parallel light. Following the above transmission mechanism, the light is transmitted through the arranged minute glass spherical bodies without attenuation.

Figure 2:
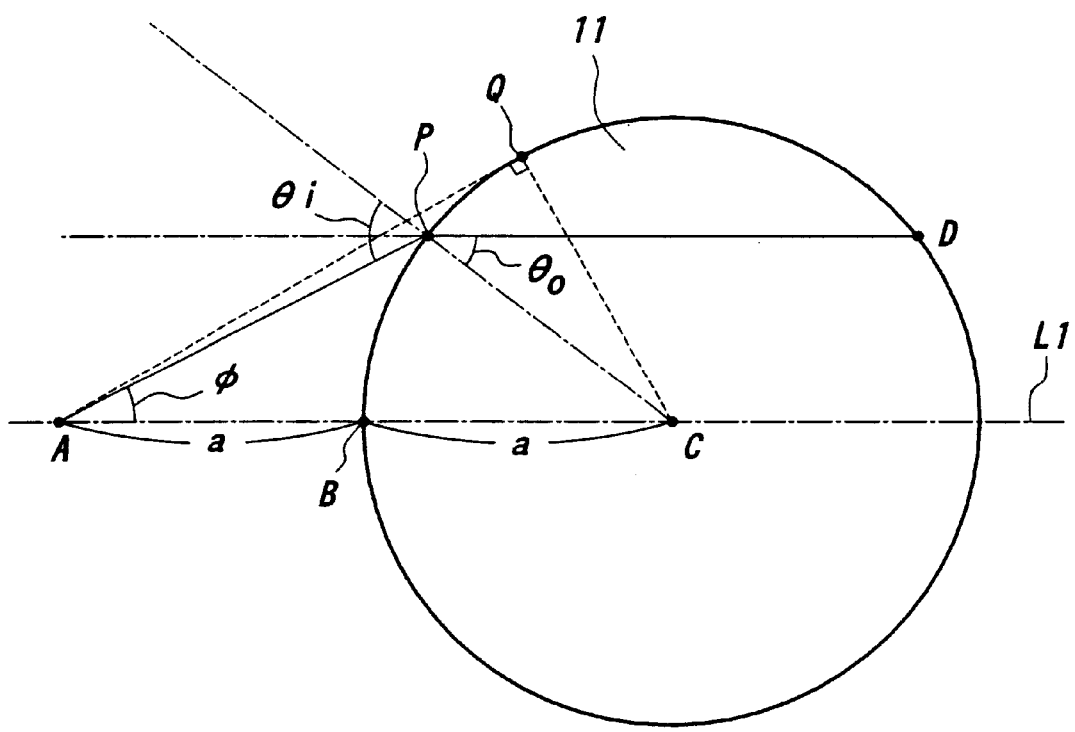
FIG. 2 is an enlarged view showing the optical transmission in the forefront glass spherical body of the optical waveguide element in FIG. 1.
Figure 4:
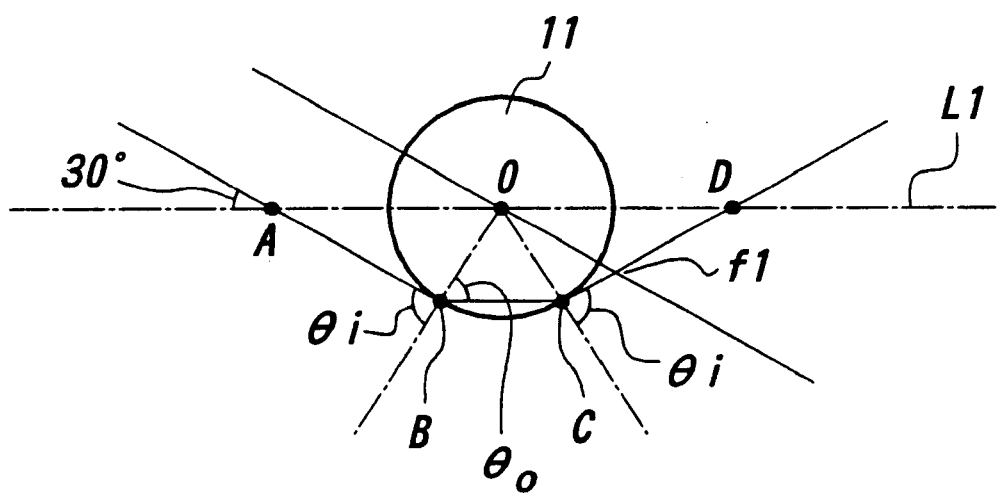
FIG. 4 is an enlarged view showing the optical transmission in the forefront glass spherical body of the optical waveguide element in the optical transmission condition in FIG. 3.

In this case, the light is required to be transmitted with following A-B-C-D order as shown in FIG. 4, which is similar to the required transmission condition in FIG. 2. Therefore, in the light transmission shown in FIG. 4, the equation (1) must be satisfied, and thus, the relation of $\sin θ0 \leq 1/n$ must be also satisfied.

Therefore, as mentioned above, it is desired that the refractive index n is large and it is required that the diameter of the glass spherical body is 100 μm or below.

If the incident angle of the parallel light is shifted from 30 degrees, the focus point is shifted and thus, the light passed through the second minute glass spherical body 12 is not a parallel light. If the distance between the glass spherical bodies is changed, the same phenomena is brought about. Therefore, the transmitted light is gradually attenuated.

In the linear arrangement of the minute glass spherical bodies as shown in FIG. 3, the parallel light is introduced (at an incident angle of 30 degrees) into the odd number's glass spherical body (11, 13), focus on the point (f1, f2) in between the odd number's and the even number's glass spherical bodies, and the focused light is passed through the even number's glass spherical body (12, 14) to be a parallel light again. If, with this view, a mirror is positioned on the light transmission path (perpendicular to the parallel light), the transmitted light is returned. Using the phenomenon, an optical resonator can be provided. (b) Circularly arrangement of the glass spherical bodies FIG. 5 is a schematic view for explaining the optical transmission in the optical waveguide element with circularly arranged minute glass spherical bodies made of transparent glass.

Figure 5:
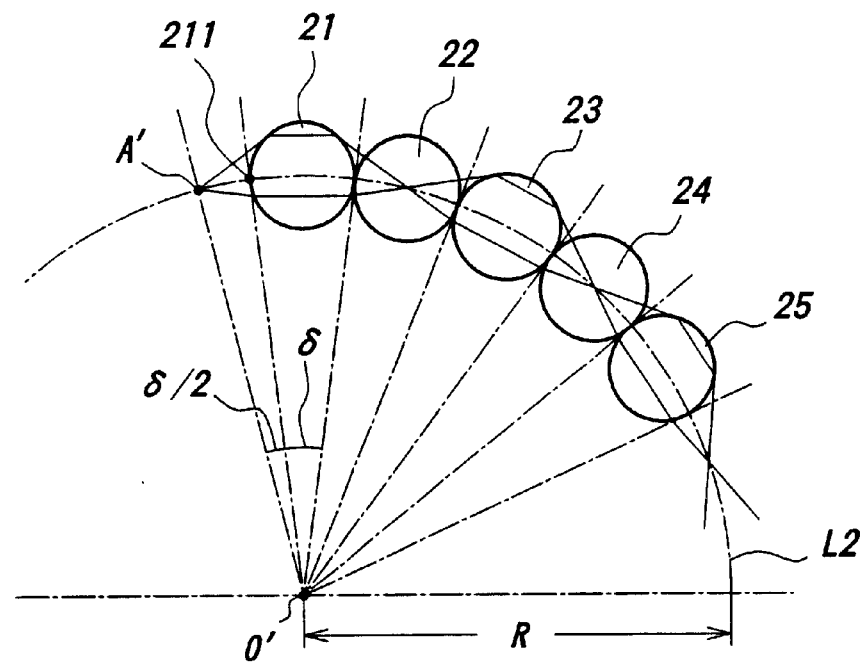
FIG. 5 is a schematic view for explaining the optical transmission in the optical waveguide element with circularly arranged minute glass spherical bodies made of transparent glass.

In FIG. 5, reference numerals 21–25 designate minute glass spherical bodies and reference character L2 designates an arrangement curve of the minute glass spherical bodies 21–25, and reference character A' designates a light source (spot light source). The light source A' is separated from the forefront 211 of the minute glass spherical body 21 by a central angle of δ/2 on the arrangement curve L2. Herein, the wording "δ" means a solid angle of the minute glass spherical body as is viewed from the center O'.

Figure 6:
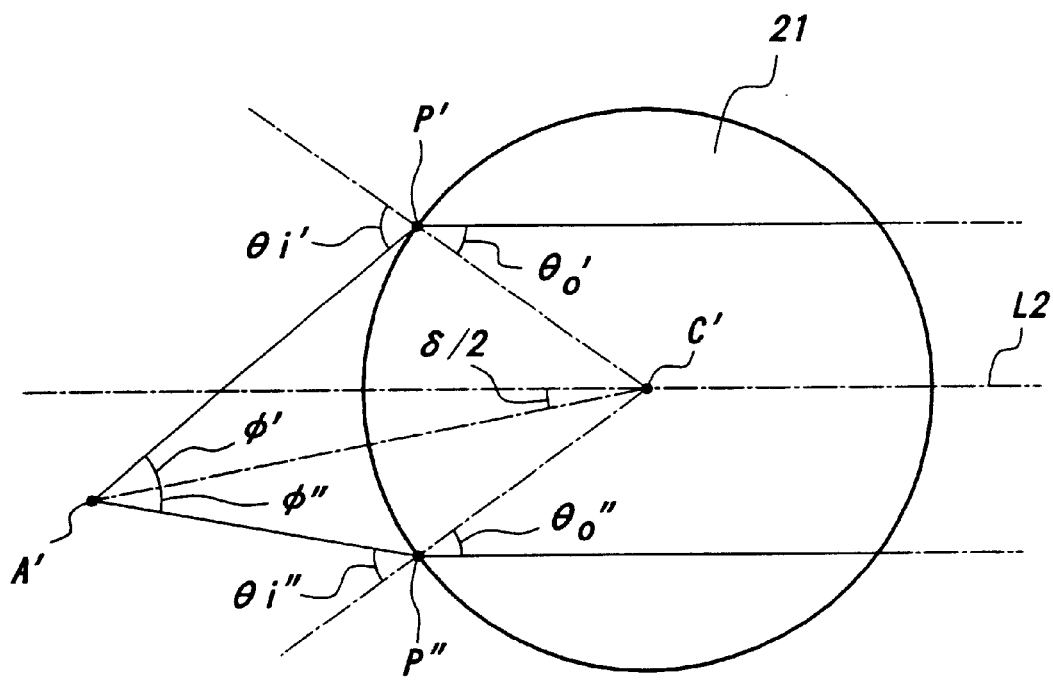
FIG. 6 is an enlarged view showing the optical transmission in the forefront glass spherical body of the optical waveguide element in FIG. 5.

For transmitting the lights introduced into the upper side from the arrangement curve L2 of the minute glass spherical body 21 horizontally into the body 21 through their refraction, as shown in FIG. 6, the following equation (2) must be satisfied:

$$n = \sin θi'/\sin θ0' = \sin \{θ0' + (δ/2) + φ'\}/\sin θ0' \quad (2)$$

Herein, θi' designates an incident angle of the light from the light source A' for the minute glass spherical body 21, and θ0' designates a refractive angle of the light from the light source A' at the spherical surface of the minute glass spherical body 21. φ' designates a solid angle of the light source A', and n designates a refractive index of the minute glass spherical body 21.

In this case, the relation of $θ0' + (δ/2) + φ' < 90$ degrees must be satisfied. Moreover, for transmitting the introduced light into the minute glass spherical body 21 from the light source A' for the subsequent minute glass spherical body 22, the relation of $θ0' > θ0$ must be satisfied. Herein, θ0 designates a refractive angle at the spherical surface of the minute glass spherical body 21 in the case of the linear arrangement of the glass spherical bodies.

For transmitting the lights introduced into the lower side from the arrangement curve L2 of the minute glass spherical body 21 horizontally into the body 21 through their refraction, as shown in FIG. 6, the following equation (2) must be satisfied:

$$n = \sin θi''/\sin θ0'' = \sin \{θ0'' + (δ/2) + φ''\}/\sin θ0'' \quad (3)$$

Herein, θi" designates an incident angle of the light from the light source A' for the minute glass spherical body 21, and θ0" designates a refractive angle of the light from the light source A' at the spherical surface of the minute is glass spherical body 21. φ" designates a solid angle of the light source A', and n designates a refractive index of the minute glass spherical body 21.

Different from the above case, in this case, the relation of $θ0 > θ0''$ must be satisfied. Moreover, for transmitting the introduced light into the minute glass spherical body 21 from the light source A' for the subsequent minute glass spherical body 22, the relation of $θ0'' - (δ/2) + φ'' > θ0''$, that is, $φ'' - δ/2 > 0$ must be satisfied.

In this case, as mentioned above, it is desired that the refractive index n is large and the spherically is 2% or below, and it is required that the diameter of the glass spherical body is 100 μm or below.

Figure 7:
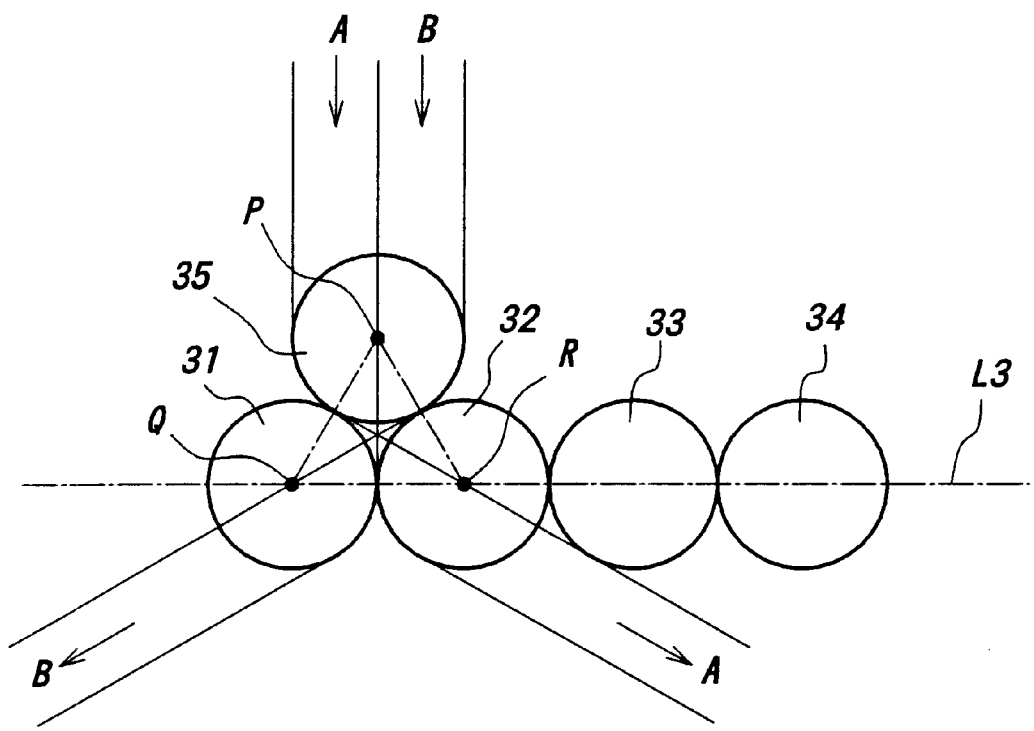
FIG. 7 is a schematic view for explaining the optical transmission in the optical waveguide element with the linearly arranged glass spherical bodies shown in FIG. 3 and another minute glass spherical body on the arranged glass bodies.

In the above embodiment, the minute glass spherical bodies are subsequently and orderly arranged, but may unorderly. (c) In the case of introducing the light into the side of the linearly arranged glass spherical bodies FIG. 7 is a schematic view for explaining the optical transmission in the optical waveguide element with the linearly arranged glass spherical bodies shown in FIG. 3 and another minute glass spherical body on the arranged glass bodies.

In this case, when a light is introduced into the minute glass spherical body 35 of the arranged glass spherical bodies with orthogonal to the arrangement axis L3, the A component and B component of the light are divided right and left from the center P of the minute glass spherical body 35, and are transmitted via the minute glass spherical bodies 32 and 31, respectively. However, the light components are not transmitted into the minute glass spherical bodies 33 and 34 or 31 and 32.

If other minute glass spherical bodies are arranged on the arrangement axis PQ between the minute glass spherical bodies 35 and 31 or on the arrangement axis PR between the minute glass spherical bodies 35 and 32, and the light transmission condition equation (1) is satisfied, the light components are transmitted alongside the arrangement axis PQ and PR, respectively. As a result, such an optical waveguide element with the above-arranged minute glass spherical bodies serves as an optical division circuit or an optical convergence circuit.

Next, the light transmission mechanism will be considered in the case that the light is introduced into the side of the arranged glass spherical bodies. (1) In the case that the light is introduced into one of the arranged minute glass spherical bodies at an incident angle of 30–90 degrees, without optical scattering, the light is passed through the introduced glass body, but is not transmitted in the arranged minute glass spherical bodies. (2) In the case that the light is introduced into the forefront one of the arranged minute glass spherical bodies at an incident angle of 30 degrees, as mentioned above, the light is transmitted in the arranged glass spherical bodied if the light is a parallel light. If the parallel light is introduced into the middle of the arranged glass spherical bodies, as shown in FIG. 7, it is transmitted out of the arrangement axis PR or PQ. (3) In the case that the light is introduced into one of the arranged minute glass spherical bodies at an incident angle of 30 degrees or below, the light is transmitted into the arranged glass spherical bodies, but is attenuated extremely.

Figure 8:
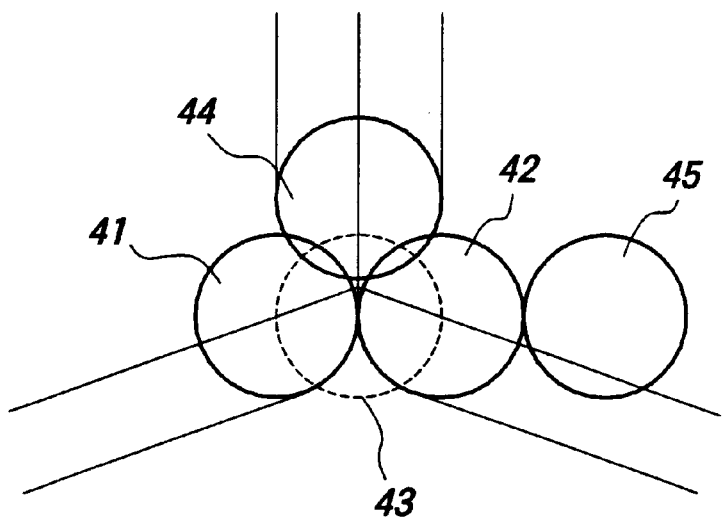
FIG. 8 is a schematic view for explaining the optical transmission in the triangular pyramid-shaped optical waveguide element with three triangularly arranged minute glass spherical bodies and another minute glass spherical body on the center of the arranged glass bodies.

FIG. 8 is a schematic view for explaining the optical transmission in the triangular pyramid-shaped optical waveguide element with three triangularly arranged minute glass spherical bodies (41, 42, 43) and another minute glass spherical body (44) on the center of the arranged glass bodies.

When the light is vertically introduced into the glass spherical body 44 which is positioned at the top of the triangular pyramid-shaped optical waveguide element, it is divided and transmitted for each of the minute glass spherical bodies 41, 42, 43.

Figure 9:
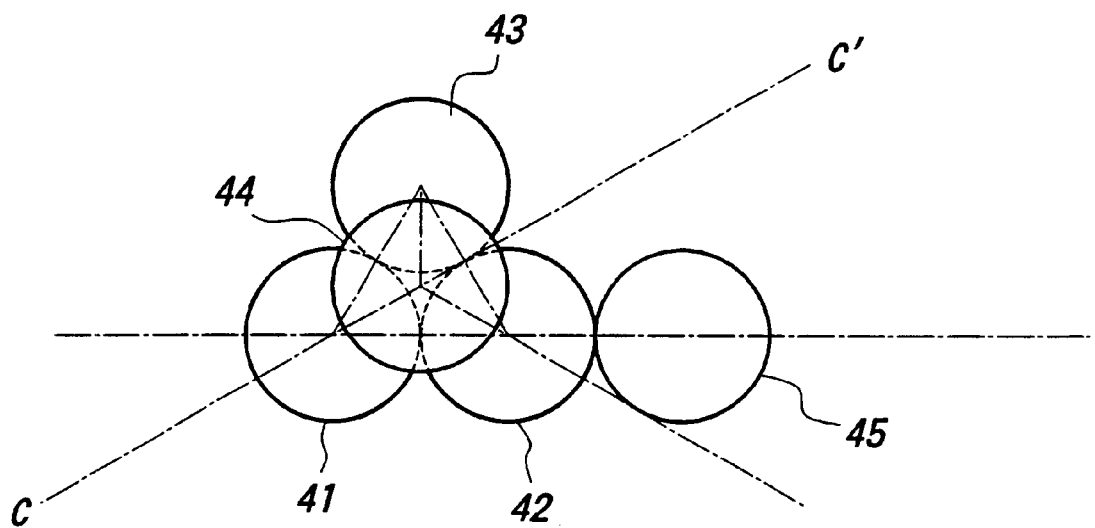
FIG. 9 is a plan view of the optical waveguide element in FIG. 8.
Figure 10:
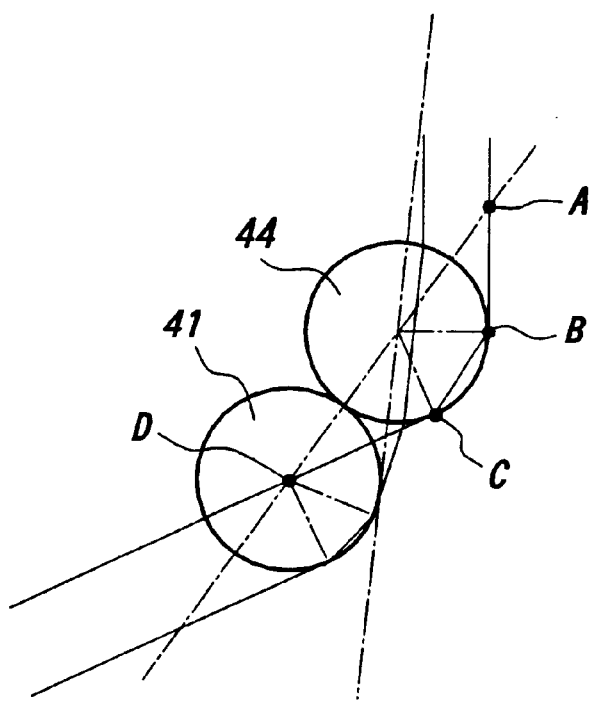
FIG. 10 is a cross sectional view, taken on line "c–c'" of the optical waveguide element in FIG. 9.

FIG. 9 is a plan view of the optical waveguide element in FIG. 8, and FIG. 10 is a cross sectional view, taken on line "c–c'" of the optical waveguide element in FIG. 9. The one-third of the light passed through the minute glass spherical body 44 is introduced and transmitted in the glass spherical body 41. Although in the transmission path A-B-C-D, the incident angle to the arrangement axis A-D is larger than 30 degrees, the transmission after the glass spherical body 41 is carried out at an incident angle of 30 degrees.

As shown in FIG. 8, when the light is introduced into the side of the triangularly arranged glass spherical bodies 41, 42, 43, it is not transmitted in the arrangement direction unless it is scattered. If other glass spherical bodies are arranged in the passing through direction, the light is transmitted out of the arrangement direction.

Two or not less than two minute glass spherical bodies can serve as the minute glass spherical body 11 in FIG. 1 by setting each of the glass spherical bodies to a given refractive index. In this case, the light from the light source is introduced into one of the glass spherical bodies, focused on the inner side of another one, and then, is transmitted in the arranged glass spherical bodies. (d) Stacking arrangement of the glass spherical bodies Minute glass spherical bodies are arranged on a substrate, and then, other glass spherical bodies are arranged on the arranged glass bodies. Moreover, further glass spherical bodies are arranged on the arranged other glass spherical bodies. Stacking glass spherical bodies in turn, an optical waveguide element with plural stacked glass spherical bodies which are two-dimensionally arranged in straight or in curve can be obtained.

In the two-dimensionally arranged glass spherical bodies, the light transmission is carried out as in the above linearly arrangement or the curved arrangement of the glass spherical bodies. The transmission light between the above- and below-arranged glass spherical bodies is not transmitted in the arranged glass spherical bodies because it crosscuts therebetween.

Although the light transmission theory is explained about the optical waveguide element with the arranged minute glass spherical bodies, the theory may be applied for the optical waveguide element with plural minute glass columnar bodies arranged in straight or in curve as are viewed from their end direction or plural stacked glass columnar bodies.

Figure 11:
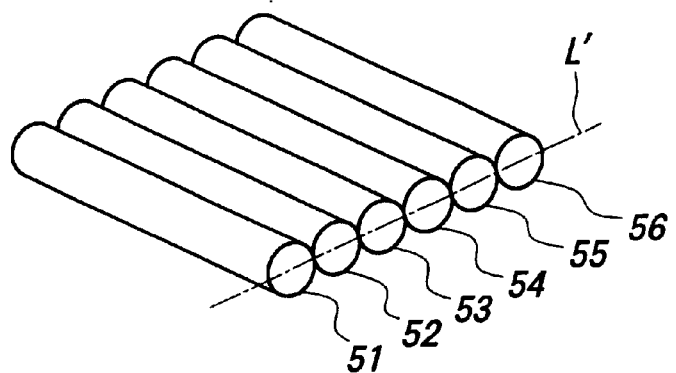
FIG. 11 is a perspective view showing an example in the optical waveguide element with plural minute glass columnar bodies of the present invention.

For example, in the case of arranging minute glass columnar bodies 51–56 in straight as are viewed from their end direction, as shown in FIG. 11, when a parallel light is introduced into the glass columnar body 51 at an incident angle of 30 degrees to the arrangement axis L', it is transmitted as in the linearly arranged glass spherical bodies in FIG. 3.

Figure 12:
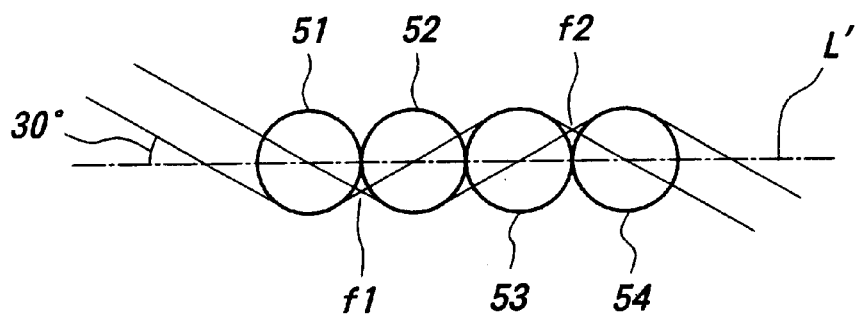
FIG. 12 is a schematic view for explaining the optical transmission in the optical waveguide element in FIG. 11.

Concretely, as shown in FIG. 12, the parallel light is introduced into the minute glass columnar body 51 at an incident angle of 30 degrees to the arrangement axis L', and is focused on the point f1 in between the minute glass columnar bodies 51 and 52. The focused light is passed through the minute glass columnar body 52 to be converted to a parallel light. The parallel light is also introduced into the minute glass columnar body 53 at an incident angle of 30 degrees to the arrangement axis L', and is focused on the point f2 in between the minute glass columnar bodies 53 and 54. The focused light is passed through the minute glass columnar body 54 to be converted to a parallel light.

That is, the parallel light is introduced into an odd number's minute glass columnar body, focused on the point between the odd number's and subsequent even number's minute glass columnar bodies, and is passed through the even number's minute glass columnar body to be converted to a parallel light. Following the above light transmission mechanism, the parallel light can be transmitted in the arranged minute glass columnar bodies without attenuation.

In this case, as mentioned above, it is desired that the refractive index n is large and the spherically is 2% or below, and it is required that the diameter of the glass spherical body is 100 $\mu$m or below.

Figure 13:
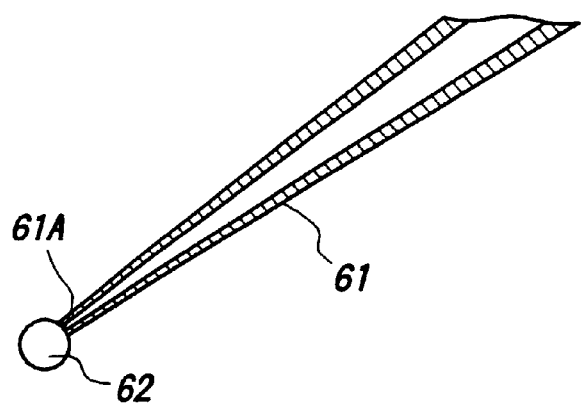
FIG. 13 is a schematic view for explaining a method for arranging the minute glass spherical bodies.

The minute glass spherical bodies may be arranged as follows: As shown in FIG. 13, first of all, an absorption pump (not shown) is attached to the base edge portion of a micropipet 61, and a minute glass spherical body 62 is absorbed and held at the other edge portion 61A. Then, the micropipet 61 is carried to a given position on a substrate by a manipulator, and after releasing the absorption, the minute glass spherical body 62 is set to a given position. Repeating the above step, minute glass spherical bodies can be arranged in a desired shape.

As mentioned above, the light introduced into the forefront minute glass spherical body is focused on the inner side of an even number's glass spherical body by the lens effect of the just before odd number's glass spherical body including the forefront glass body. Repeating the process, the light is transmitted in the arranged minute glass spherical bodies. Then, using the light transmission mechanism, the transmission light can be crossed three-dimensionally on a single substrate.

Moreover, the optical waveguide element with the minute glass spherical bodies or the minute glass columnar bodies can be integrated because of their minute cross sections and diameters or lengths.

Furthermore, arranging the minute glass spherical bodies or the minute glass columnar bodies appropriately, a three-dimensional optical waveguide can be obtained, and thereby, a three-dimensional optical waveguide circuit can be made monolithically.

Three-dimensional Optical Waveguide Circuit

Figure 14:
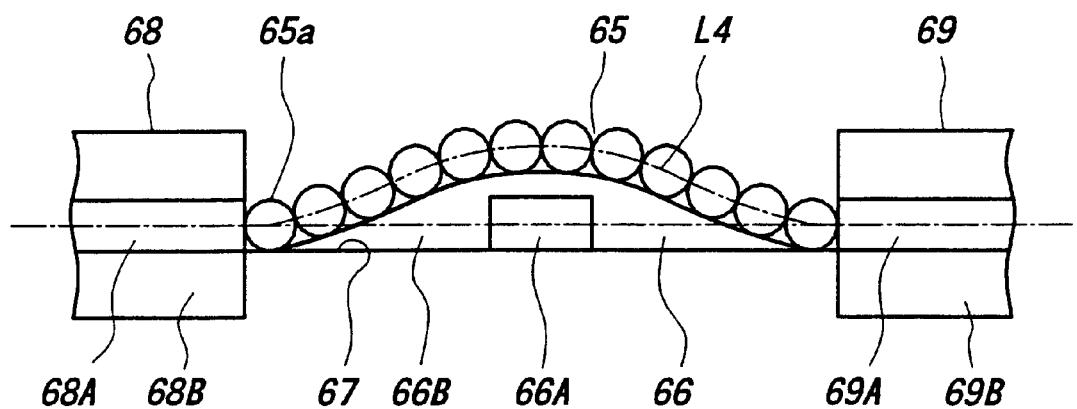
FIG. 14 is a cross sectional view showing an example in the three-dimensional optical waveguide circuit of the present invention.

FIG. 14 is a cross sectional view showing an example in the three-dimensional optical waveguide circuit of the present invention.

The depicted three-dimensional optical waveguide circuit has a flat glass substrate 67, a thin film optical waveguide 66 formed on the substrate 67, an optical waveguide 65 (according to the present invention) crossing on the thin film optical waveguide 66 three-dimensionally, an optical fibers 68 and 69 joined to the optical waveguide 65.

The thin film optical waveguide 66 has a core 66A with a rectangular cross section and a clad 66B to cover the core 66A.

The optical waveguide 65 has minute glass spherical bodies arranged in curve and thereby, has an arch-like crossing shape.

The optical fiber 68 introduces a light into the optical waveguide 65, and has a core 68A and a clad 68B.

The optical fiber 69 pulls the light out of the optical waveguide 65, and has a core 69A and a clad 69B.

In the three-dimensional optical waveguide, the light introduced into the optical fiber 68 from a light source (not shown) is transmitted in the core 68A, and introduced into the forefront minute glass spherical body 65*a* of the optical waveguide 65. The light is transmitted in the optical waveguide 65 alongside the arrangement axis L4, and is introduced into the core 69A of the optical fiber 69. At the same time, another light is introduced into the thin film optical waveguide 66 from another light source (not shown). Therefore, two lights to be transmitted cross on the glass substrate 67 three-dimensionally.

Figure 15:
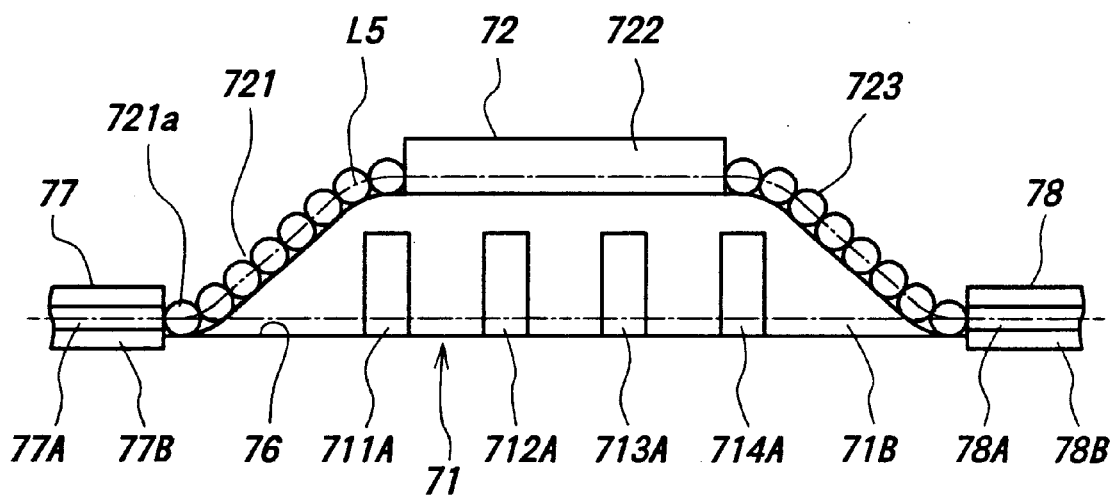
FIG. 15 is a cross sectional view showing another example in the three-dimensional optical waveguide circuit of the present invention.

FIG. 15 is a cross sectional view showing another example in the three-dimensional optical waveguide circuit of the present invention.

The depicted three-dimensional optical waveguide circuit has a flat glass substrate 76, a thin film optical waveguide 71 formed on the substrate 76, a coupling optical waveguide 72 crossing on the thin film optical waveguide 71 three-dimensionally, an optical fibers 77 and 78 joined to the coupling optical waveguide 72.

The thin film optical waveguide 71 has cores 711A–714A with rectangular cross sections and a clad 71B to cover the cores.

The coupling optical waveguide 72 has an optical waveguide 721 (according to the present invention) with arranged plural minute glass spherical bodies, an optical fiber 722 and an optical waveguide 723 (according to the present invention) with arranged plural minute glass spherical bodies which are coupled, and crosses on the thin film optical waveguide 71 three-dimensionally. The optical fiber 77 introduced a light into the optical waveguide 721, and is composed of a core 77A and a clad 77B. The optical fiber 78 pulls the light out of the optical waveguide 723, and is composed of a core 78A and 78B.

In the three-dimensional optical waveguide, the light introduced into the optical fiber 77 from a light source (not shown) is transmitted in the core 77A, and introduced into the forefront minute glass spherical body 721*a* of the optical waveguide 721. The light is transmitted in the coupling optical waveguide 72 alongside the arrangement axis L5, and is introduced into the core 78A of the optical fiber 78. At the same time, another light is introduced into the thin film optical waveguide 71 from another light source (not shown). Therefore, two lights to be transmitted cross on the glass substrate 76 three-dimensionally.

Figure 16:
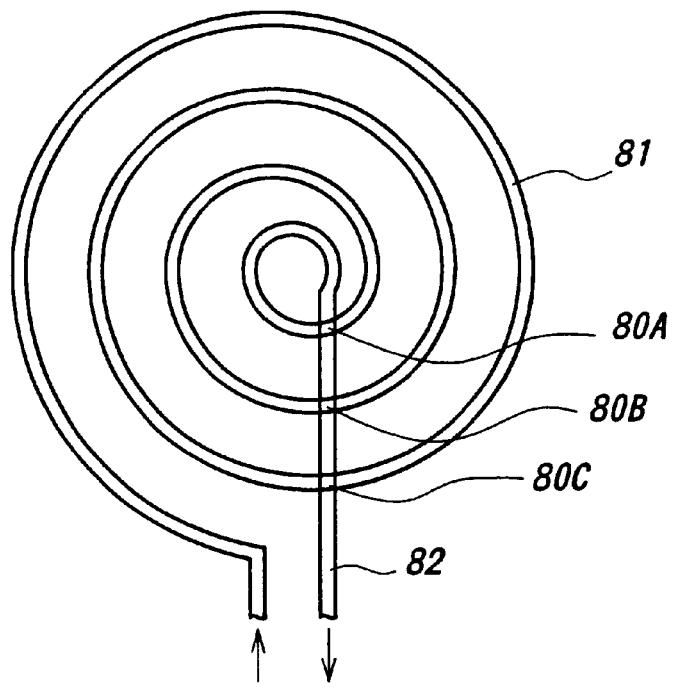
FIG. 16 is a plan view showing an optical waveguide coil in a laser gyroscope.

Therefore, in an optical waveguide coil of a laser gyroscope shown in FIG. 16, a ring shaped optical waveguide 81 and a linear optical waveguide 82 can be crossed three-dimensionally at positions 80A–80C.

Optical system

Figure 17:
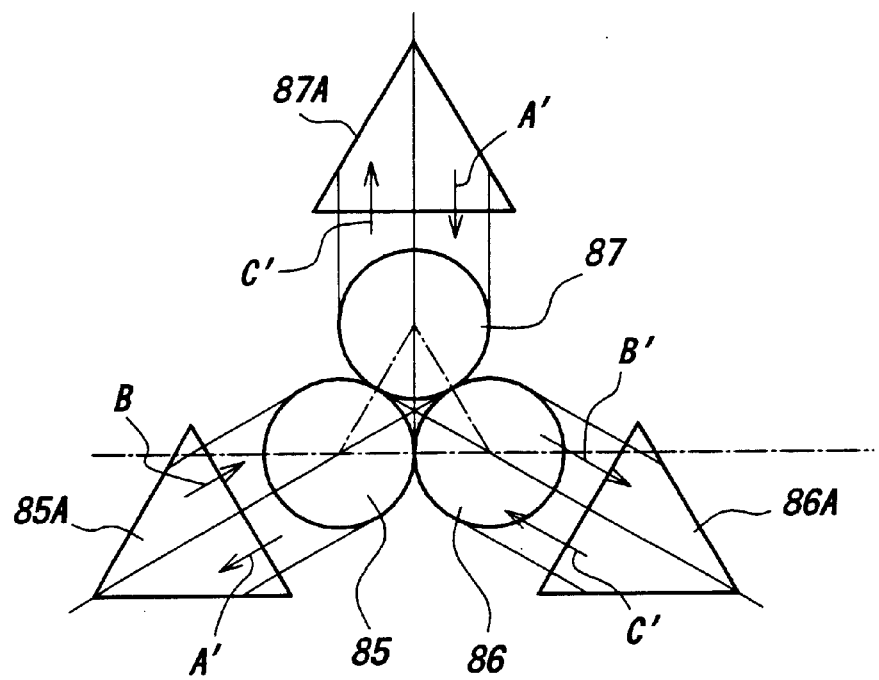
FIG. 17 is a schematic view showing an example of the optical system of the present invention.

FIG. 17 is a schematic view showing an example of the optical system of the present invention. The depicted optical system has a optical element (according to the present invention) with arranged three minute glass columnar bodies 85, 86, 87, and total reflection triangular prisms 85A, 86A, 87A arranged around the minute glass columnar bodies.

When a parallel light A' is introduced into the minute glass columnar body 87 positioned at the top of the optical element, for example, it is transmitted for the minute glass columnar body 85 on basis of the light transmission mechanism. Then, the parallel light A' is reflected at the prism 85A positioned in the transmission direction, and is introduced, as a parallel light B', into the minute glass columnar body 85 again. Then, the parallel light B' is transmitted into the minute glass columnar body 86, and is reflected at the prism 86A positioned in the transmission direction. The parallel light B' is introduced, as a parallel light C', into the minute glass columnar body 86.

The parallel light C' is introduced into the minute glass columnar body 87, and is reflected at the prism 87A positioned at the transmission direction. As a result, the parallel light C' is superimposed on the parallel light A'. Lastly, an optical loop can be formed on the optical system shown in FIG. 17.

Such an optical loop can be formed on an optical system having minute glass spherical bodies.

Moreover, on an optical system having four minute glass spherical bodies arranged in triangular pyramid as shown in FIG. 8 and four prisms arranged around the four minute glass spherical bodies, respectively, a triangular pyramid-shaped optical loop can be formed.

EXAMPLES

Example 1

Figure 18:
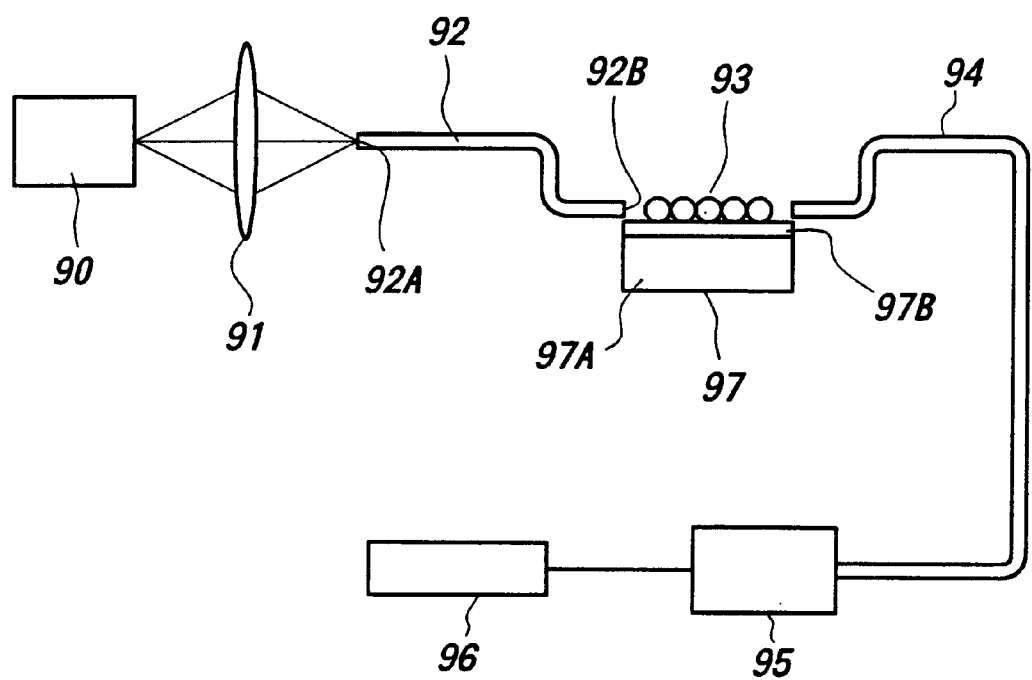
FIG. 18 is a schematic view showing the arrangement of the measuring system in the embodiments of the present invention.

FIG. 18 is a schematic view showing the arrangement of the measuring system in this example. In the measuring system, a light from a light source 90 is introduced into the forefront 92A of an optical fiber 92 via a lens 91, and is introduced into the forefront glass spherical body of an optical waveguide 93 (according to the present invention) from the rear end 92B of the optical fiber 92. Then, the light is transmitted in the optical waveguide 93, and is detected by an optical fiber probe 94. The detected light is amplified at an optical amplifier (photomultiplier) 95, and read out at an oscilloscope 96.

A semiconductor laser element with a 670 nm wavelength is employed as the light source 90.

The optical fiber 92 and the optical fiber probe 94 are processed in a clad diameter of about 5 µm by a thermal drawing method for introducing and detecting the light from the light source 90, and treated in a hydrofluoric acidic solution.

A substrate 97 is composed of a flat glass substrate 97A and a coated layer 97B with a thickness of 5 µm made of PMMA (polymethyl methacrylate) by spin coating. The optical waveguide 93 is formed on the substrate 97 by aligning five minute glass spherical bodies with a diameter of 100 µm.

In the above measuring system, a light is introduced into the optical waveguide 93 from the rear end 92B of the optical fiber 92, which is separated from the forefront glass spherical body by 5 µm and arranged on the arrangement axis of the optical waveguide 93. As a result, the transmitted light through the minute glass spherical bodies is detected at the optical fiber probe 94.

Example 2

In this example, a similar measuring system to the one in Example 1 except composing the optical waveguide of arranged glass spherical bodies in curve is employed.

In the above measuring system, a light is introduced into the optical waveguide 93 from the rear end 92B of the optical fiber 92, which is separated from the forefront glass spherical body by a solid angle of δ/2 for the arrangement center of the glass spherical bodies. As a result, the transmitted light through the minute glass spherical bodies is detected at the optical fiber probe 94.

Therefore, it is ascertained that a light can be transmitted in the optical waveguide element according to the present invention.

Moreover, when the introducing position of the light or the position of the optical fiber probe is shifted, the detected light intensity is largely changed. Thus, the above light transmission theory is ascertained.

As mentioned above, according to the optical waveguide element of the present invention, the light transmission path with any arrangement like in curve can be obtained. Moreover, the three-dimensionally crossing light transmission path can be obtained.

Furthermore, according to the optical waveguide element of the present invention, high density-integrated optical elements can be optically joined easily and precisely one another. And then, the monolithic three-dimensionally optical waveguide circuit with three-dimensionally crossing light transmission path can be obtained.

As a result, the optical system of the present invention can preferably be employed for an optical integrated circuit, a laser gyroscope, an optical connecting circuit between terminals of LSI elements, a wavelength-multiple circuit, an optical resonator or the like.

What is claimed is:

1. An optical waveguide element comprising arranged plural spherical bodies with diameters of not more than 100 µm made of transparent uniform glass, the plural spherical bodies arranged such that a light is guided serially through more than one of said spherical bodies.

2. An optical waveguide element as defined in claim 1, wherein each of the plural spherical bodies have a diameter of 1–100 µm.

3. An optical waveguide element as defined in claim 1, wherein the plural spherical bodies are arranged in straight.

4. An optical waveguide element as defined in claim 3, wherein the plural spherical bodies constitute one unit, and plural units are stacked in a direction perpendicular to the arrangement direction of the plural spherical bodies constituting the one unit.

5. An optical waveguide element as defined in claim 1, wherein the plural spherical bodies are arranged in curve.

6. An optical waveguide element as defined in claim 5, wherein the plural spherical bodies constitute one unit, and plural units are stacked in a direction perpendicular to the arrangement direction of the plural spherical bodies constituting the one unit.

7. A three-dimensional optical waveguide circuit comprising an optical waveguide element as defined in claim 1 and a thin film optical waveguide element crossing with the optical waveguide element three-dimensionally.

8. An optical system comprising an optical waveguide element as defined in claim 1 and an external optical system.

* * * * *